(12) United States Patent
Imhof

(10) Patent No.: US 8,191,579 B2
(45) Date of Patent: Jun. 5, 2012

(54) DIRECTIONAL OR FLOW CONTROL VALVE

(75) Inventor: Rainer Imhof, Frammersbach (DE)

(73) Assignee: Robert Bosch GmbH, Stuttgart (DE)

( * ) Notice: Subject to any disclaimer, the term of this patent is extended or adjusted under 35 U.S.C. 154(b) by 1063 days.

(21) Appl. No.: 11/677,205

(22) Filed: Feb. 21, 2007

(65) Prior Publication Data

US 2007/0199601 A1 Aug. 30, 2007

(30) Foreign Application Priority Data

Feb. 24, 2006 (DE) .......................... 10 2006 009 166
May 22, 2006 (DE) .......................... 10 2006 024 148
Jul. 25, 2006 (DE) .......................... 10 2006 034 366

(51) Int. Cl.
    *F16K 3/26* (2006.01)

(52) U.S. Cl. ............ 137/625.38; 137/625.64; 251/30.04

(58) Field of Classification Search ............... 137/625.6, 137/625.63, 625.64, 625.38; 251/29, 30.01, 251/30.04

See application file for complete search history.

(56) References Cited

U.S. PATENT DOCUMENTS

| 80,509 | A | * | 7/1868 | Sanderson | ............... | 137/625.38 |
| 2,983,286 | A | * | 5/1961 | Greenawalt et al. | ........ | 251/30.03 |
| 3,794,063 | A | * | 2/1974 | Carroll et al. | ............. | 137/625.3 |
| 4,756,330 | A | * | 7/1988 | Tischer | ....................... | 137/625.3 |
| 5,520,217 | A | * | 5/1996 | Grawunde | ............... | 137/625.63 |
| 5,896,890 | A | * | 4/1999 | Bourkel et al. | ........... | 137/625.63 |
| 6,405,746 | B2 | * | 6/2002 | Harms et al. | ............. | 137/625.64 |
| 7,422,033 | B2 | * | 9/2008 | Barber | ..................... | 137/625.64 |
| 7,766,041 | B2 | * | 8/2010 | Tackes et al. | .............. | 137/625.3 |
| 2004/0154672 | A1 | * | 8/2004 | Liberfarb | ................ | 137/625.64 |
| 2006/0130914 | A1 | * | 6/2006 | Barber | ..................... | 137/625.64 |

FOREIGN PATENT DOCUMENTS

| DE | 42 14 661 | 11/1993 |
| DE | 196 32 368 | 2/1998 |
| DE | 10 2004 019 748 | 11/2005 |

* cited by examiner

*Primary Examiner* — Kevin Lee
*Assistant Examiner* — Craig J Price
(74) *Attorney, Agent, or Firm* — Michael J. Striker

(57) ABSTRACT

A directional or flow control valve has an inlet connection, an outlet connection, and a slide that controls a fluid connection between the inlet connection and the outlet connection and is configured to control the fluid connection in at least two adjustable opening cross-sections that are spaced axially apart from each other and allow a partial flow to pass through.

6 Claims, 7 Drawing Sheets

DIRECTIONAL OR FLOW CONTROL VALVE

CROSS-REFERENCE TO A RELATED APPLICATION

The invention described and claimed hereinbelow is also described in German Patent Application DE 110 2006 034 366.2 filed on This German Patent Application, whose subject matter is incorporated here by reference, provides the basis for a claim of priority of invention under 35 U.S.C. 119(a)-(d).

BACKGROUND OF THE INVENTION

The invention relates to a directional or flow control valve.

The invention can generally be used in valves for adjusting a flow of pressure fluid, particularly in 2-way valves or continuously adjustable orifices. An important application field includes flow control valves that can keep a set flow rate constant independent of pressure fluctuations. This is achieved by virtue of the fact that an adjustable metering orifice is associated with a pressure compensator, which is acted on in the opening direction by both the force of a spring and a pressure downstream of the metering orifice and is acted on in the closing direction by the pressure upstream of the metering orifice. In principle, the pressure compensator can be situated before or after the adjustable metering orifice.

A flow control valve with a pressure compensator situated after a metering orifice is disclosed in the patent application DE 10 2004 019 748 A1 of the applicant. In this flow control valve, the metering orifice has a metering orifice slide that is guided in a valve bushing and spring-loaded in the closing direction. The opening cross section of the metering orifice is comprised of circumference openings of a star-shaped arrangement of bores in the metering orifice slide in cooperation with a circumferential control edge of an annular conduit in the valve bushing, which annular conduit is fluid-connected to an outlet connection B of the valve bushing. The outlet cross section of the fluid connection between the annular conduit and the outlet connection B can be changed by means of a pressure compensator spool that is contained in the valve bushing and that encompasses the metering orifice slide with an end section.

In this design, it is disadvantageous that in the region ot the star-shaped arrangement of bores, instances of relatively high flow resistance occur so that this directional or flow control valve has a correspondingly reduced performance.

SUMMARY OF THE INVENTION

The object of the present invention is to create a directional or flow control valve with a reduced flow resistance.

A valve according to the invention has an inlet connection and an outlet connection and has a slide that is able to control a fluid connection between the inlet connection and the outlet connection. The slide controls the fluid connection in at least two adjustable opening cross sections that are spaced axially apart from each other and allow a parallel flow to pass through.

A preferred use of the invention is in flow control valves in which the metering orifice is associated with a pressure compensator, which is able to keep the pressure drop due to the metering orifice constant, independent of the load pressure.

In particular, a maximum second opening cross section can be less than or equal to a maximum first opening cross section.

In a preferred embodiment, the opening cross sections are able to open a fluid connection to a shared annular chamber that contains the outlet connection. The end of the shared annular chamber can be delimited by the pressure compensator spool.

Preferably, the second control edge on the housing is comprised of an annular conduit that is fluid-connected to the shared annular chamber via at least one diagonal bore.

The valve is particularly simple to manufacture if the slide is guided in a slide bushing that is inserted into a valve bore of the valve housing and in some regions, delimits the control edges, the annular chamber, the annular conduit, and the at least one diagonal bore.

In one embodiment, an end section of the pressure compensator spool is guided on the outer circumference of the slide bushing.

In order to damp the pressure compensator, the pressure compensator spool can overlap the slide bushing or a section affixed to the housing and a friction ring can be provided in this overlap region. Such a ring simultaneously performs a sealing function. A conventional O-ring or a floating ring seal can be used for the friction ring.

In a simplified embodiment, the pressure compensator spool is guided directly in the housing of the valve, thus making it possible to eliminate a separate guide bushing for the pressure compensator spool.

Preferably, the slide that determines the opening cross sections is embodied as a hollow slide, at least some regions of which permit pressure fluid to flow through.

At a comparatively low output volume, it is sufficient to trigger the valve according to the invention by means of an actuator, for example a proportional magnet. In order to increase the output volume, the valve can be embodied with a pilot control; it has turned out to be particularly advantageous to use a hydraulic sequence control. A sequence control of this kind is described for proportional valves, for example, in the patent applications DE 196 32 368 A1 and DE 42 14 661 A1.

The valve can be embodied in a particularly compact fashion if this sequence control has a pilot control spool, which is guided in the slide and can in turn be adjusted by means of an actuator, for example a proportional magnet, in order to open or close an outlet throttle cross section; the pressure upstream of this outlet throttle cross section that is controlled by the pilot control spool acts on the slide in the direction toward a reduction in the opening cross section and the pressure in the inlet connection of the valve acts on the slide in the direction toward an increase in the opening cross section. The pressure ratios and the triggering of the pilot control valve can also be embodied as the kinematic reverse of the ratios mentioned above. Consequently, in a sequence control of this kind, a movement of the pilot control spool moves the slide in a corresponding fashion until this reestablishes an equilibrium of forces. A sequence control of this kind produces a boosting of the hydraulic adjusting force so that it is possible to control even powerful flow forces on the slide with relatively small proportional magnets.

In sequence controls of this kind, preferably a fixed throttle is provided in the control fluid flow path, upstream of the outlet throttle cross section controlled by the pilot control spool.

In a very simply designed embodiment, the pilot control valve is provided with an internal bore via which the control fluid is conveyed from the fixed throttle to a control surface that is situated at the rear end of the slide and acts in the closing direction.

In order to directly transmit a tappet movement of the proportional magnet, a prestressing spring prestresses the pilot control spool toward the tappet.

The preferred application field of the directional valve according to the present invention might be in switchable or continuously adjustable 2-way valves or orifices.

The flow control valve is preferably embodied in the form of a 3-way flow control valve; the pressure compensator spool can open a fluid connection to a tank connection provided in the housing of the flow control valve to permit an excess flow of pressure fluid to drain to the tank.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
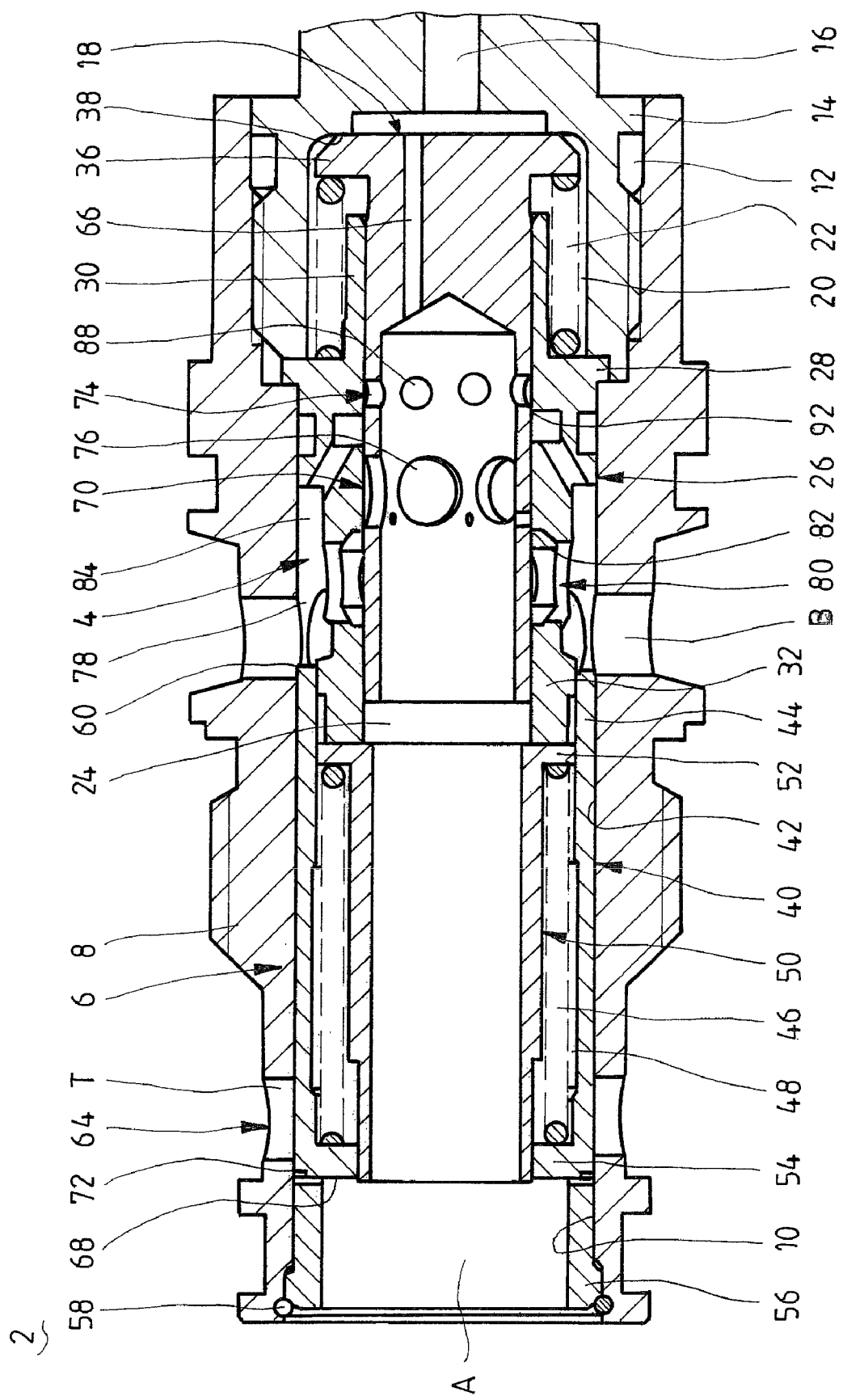
FIG. 1 is a longitudinal section through a 3-way flow control valve according to the invention.

FIG. 1 shows a longitudinal section through a hydraulic 3-way flow control valve 2 that has an adjustable metering orifice 4 and a pressure compensator 6, which is connected downstream of the metering orifice 4, that combine to form a flow regulator that can keep the pressure drop due to the metering orifice 4 constant, independent of the load pressure, temperature fluctuations, and pressure fluctuations at the inlet connection A and outlet connection B.

The flow control valve 2 has a multipart valve housing 8 with an axial valve bore 10 that has a radial expansion 12 on the right in the view shown in FIG. 1. In the region of the radial expansion 12, the valve housing 8 encompasses a fastening section 14 and is screw-connected to it. In the fastening section 14, a tappet bore 16 is provided to accommodate a tappet, not shown, of a proportional magnet provided to move a metering orifice slide 18 of the metering orifice 4. The tappet bore 16 opens out into a radially enlarged spring chamber 20 provided to accommodate a compression spring 22 that prestresses the metering orifice slide 18 into the closed position.

The metering orifice slide 18 is guided in an axial bore 24 of a slide bushing 26 inserted into the valve bore 10, which is fixed in position by means of a radial collar 28 whose end surfaces are clamped between the valve housing 8 and the screwed-in fastening section 14. A detailed description of the metering orifice slide 18 and the metering orifice 4 will be given in conjunction with FIG. 2.

The slide bushing 26 has an end section 30 that extends beyond the radial collar 28 in the axial direction and is situated on the right according to the view shown in FIG. 1; this end section 30 protrudes into the spring chamber 20 of the fastening section 14 and is encompassed by the compression spring 22, which rests against the radial collar 28 and engages a spring plate 36 of the metering orifice slide 18 so that the latter is pressed into its closed position with its end surface against a bottom surface 38 of the spring chamber 20.

The pressure compensator 6 has a pressure compensator spool 40, which is guided on an inner wall 42 of the valve bore 10 and whose end section encompasses the metering orifice slide 18 and the slide bushing 26, thus forming an overlap section 44.

The pressure compensator spool 40 is prestressed in the opening direction by a regulating spring 46 so that in its prestressed neutral position, pressure fluid can flow out to the outlet connection B. The regulating spring 46 is situated in a chamber 48 that is radially delimited by the pressure compensator spool 40 and a pressure compensator bushing 50 whose end surface rests against an end section 32 of the slide bushing 26 on the left in the view shown in the drawing. The regulating spring 46 rests against a flange 52 of the pressure compensator bushing 50 and engages a collar 54 of the pressure compensator spool 40 so that the latter is prestressed against a spacer bushing 56 that is inserted into the valve bore 10 and secured by means of a securing ring 58. In this neutral position, as mentioned previously, the outlet connection B is open while a tank control edge 72 of the pressure compensator spool 40 closes a star-shaped arrangement of radial bores 64 constituting a tank connection T.

In order to open the star-shaped arrangement of radial bores 64 constituting the tank connection T, the pressure compensator spool 40 has an effective annular end surface 68 oriented toward the inlet connection A. Consequently, the pressure in the inlet connection A acts on the pressure compensator spool 40 in the closing direction and the pressure downstream of the metering orifice 4 acts on it in the opening direction.

Figure 2:
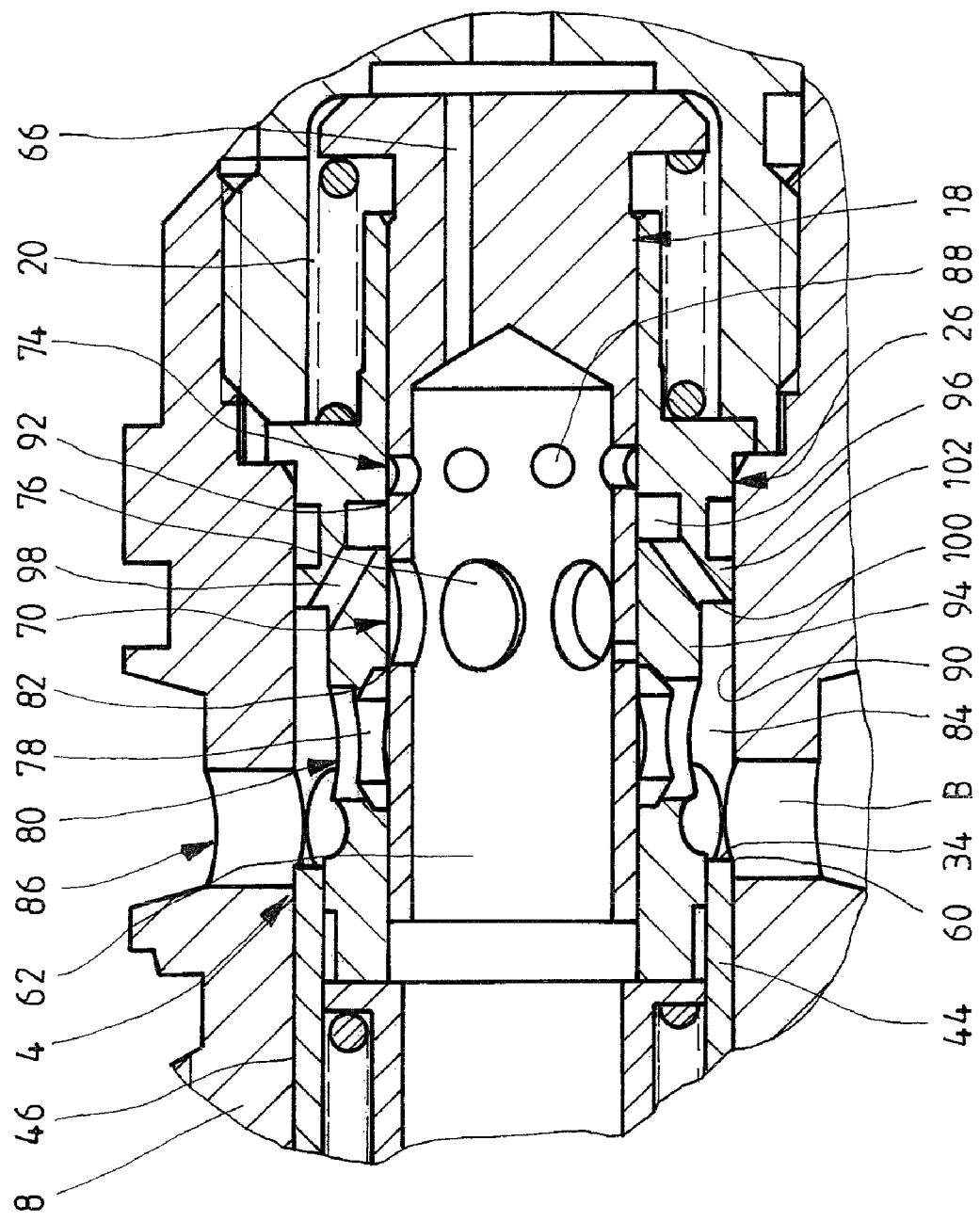
FIG. 2 is an enlarged depiction of a metering orifice shown in FIG. 1.

According to FIG. 2, which is an enlarged depiction of the flow control valve 2 in the region of the metering orifice 4, the metering orifice slide 18 has an axial blind hole bore 62 whose opening is oriented toward the inlet connection A at the end and whose base end is fluid-connected to the spring chamber 20 of the fastening section 14 via a conduit 66. In the region of the blind hole bore 62, the metering orifice slide 18 contains two star-shaped arrangements of bores 70, 74 that are spaced apart from each other in the axial direction.

The star-shaped arrangement of bores 70 on the left in the view shown in FIG. 2 has a large number of circumferential openings 76, which, together with a control edge 82 on the housing, constitute a first adjustable metering orifice cross section. The control edge 82 on the housing is comprised of openings 78 in the slide bushing 26. The openings 78 open into an annular chamber 84 that is fluid-connected to a star-shaped arrangement of radial bores 86 that constitutes the outlet connection B.

The annular chamber 84 is delimited in the radial direction by an inner circumference section 90 of the valve bore 10 and by an outer circumference section 94 of the slide bushing 26, which respectively have the star-shaped arrangement of radial bores 86 and the openings 78 passing through them. The annular chamber 84 is delimited in the axial direction by an end surface 34 of the overlap section 44 of the pressure compensator spool 40 oriented toward the annular chamber 84 and by an end surface 100 of a circumferential rib 102 of the slide bushing 26. In this case, the end surface 34 of the overlap section 44 constitutes a pressure compensator control edge 60 for opening and closing the star-shaped arrangement of radial bores 86.

The star-shaped arrangement of bores 74 on the right in the view shown in FIG. 2 is comprised of a large number of circumferential bores 88, which, together with a second control edge 92 constituted by a circumferential annular conduit 96 in the slide bushing, comprise a second adjustable metering orifice cross section, which, together with the first metering orifice cross section, constitutes the entire flow cross section of the metering orifice 4. In this embodiment, the maximum opening cross section of the first metering orifice cross section is greater than the maximum opening cross section of the second metering orifice cross section.

The annular conduit 96 is fluid-connected to the annular chamber 84 via a plurality of diagonal bores 98 in the slide bushing 26.

Figure 3:
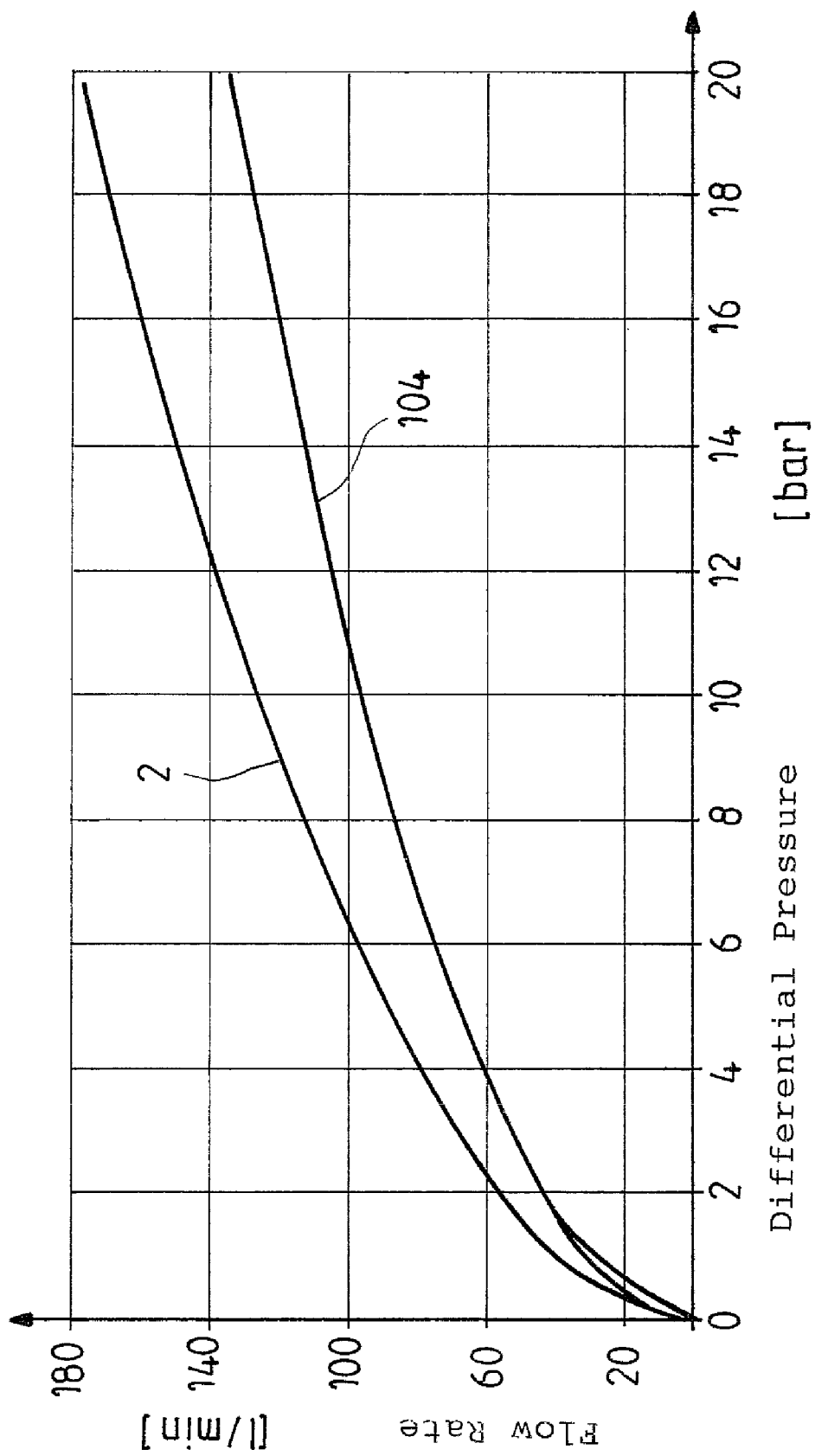
FIG. 3 is a performance diagram of the 3-way flow control valve according to FIG. 1, in comparison to a conventional 3-way flow control valve.

FIG. 3 is a graph comparing the 3-way flow control valve 2 according to the invention to a conventional 3-way flow control valve 104. The respective flow rates are plotted over the differential pressure; it is clear from the curves that at the same differential pressure as the conventional 3-way flow control valve 104, the flow control valve 2 according to the invention has an increased flow rate and therefore a reduced flow resistance.

The 3-way flow control valve 2 in FIG. 1 is shown in the neutral position when the proportional magnet is without current. In this neutral position, the circumferential openings 76 and the circumferential bores 88 are closed, i.e. the flow control valve 2 is embodied so that it is closed when in the currentless neutral position. In order to regulate a flow of pressure fluid from the inlet connection A to the outlet connection B, the proportional magnet is triggered and the tappet, not shown, is correspondingly moved toward the left (FIG. 1) so that the metering orifice slide 18 is moved along with it, counter to the force of the compression spring 22. After overcoming a small overlap, the circumferential openings 76 and circumferential bores 88 are opened by the first control edge 82 and second control edge 92 so that pressure fluid can flow through the inlet connection A via the blind hole bore 62, the star-shaped arrangements of bores 70, 74, and the opened metering orifice cross sections into the annular chamber 84.

From there, the pressure fluid flows out to the outlet connection B through the star-shaped arrangement of radial bores 86. In this case, the pressure in the inlet connection A acts on the annular end surface 68 of the pressure compensator spool 40 in the closing direction, i.e. in the direction toward a reduction In the outlet cross section of the star-shaped arrangement of radial bores 86 (FIG. 1) of the outlet connection B, and the pressure downstream of the metering orifice cross sections (star-shaped bore arrangements 70, 74) acts on the rearward-facing end surface 34 in the direction toward an increase in the outlet cross section. The force of the regulating spring 46 acts in the same direction. The pressure compensator spool 40 assumes an equilibrium position in which the pressure drop due to the metering orifice cross sections is kept essentially constant. Via the blind hole bore 62 and the conduit 66, the pressure at the inlet connection A also prevails in the spring chamber 20 so that the two end surfaces of the metering orifice slide 18 are pressure balanced.

In the equilibrium position of the pressure compensator spool 40, the tank control edge 72 opens the opening cross section of the star-shaped arrangement of radial bores 64 of the tank connection T so that excess pressure fluid can drain to the tank T. In other words, the excess flow of pressure fluid is discharged into the tank T essentially via the opening of the connection. Consequently, the changing of the outlet cross section of the outlet connection B that is opened or closed by the pressure compensator control edge 60 plays a subordinate role in a 3-way flow control valve 2 of this kind. In principle, in a circuit of this kind, the pressure compensator 6 is not connected in series with the metering orifice 4, but in parallel with it.

Naturally, the metering orifice slide 18 can also be provided with other star-shaped arrangements of bores spaced axially apart from the first two star-shaped arrangements of bores 70, 74. Likewise, the maximum second metering orifice cross section can be equal to or greater than the maximum first metering orifice cross section.

FIGS. 4 through 7 show another exemplary embodiment of a flow control valve embodied in accordance with the concept of the invention, which differs from the embodiment described above essentially through a simpler design of the pressure compensator 6 and through a concrete embodiment of a pilot control that is partially integrated into the metering orifice slide 18 and is embodied in the form of a hydraulic sequence control 106. In the above-described embodiment, it is possible to use a direct triggering, for example by means of a proportional magnet, or also the sequence control described in more detail below.

Figures 4, 5:
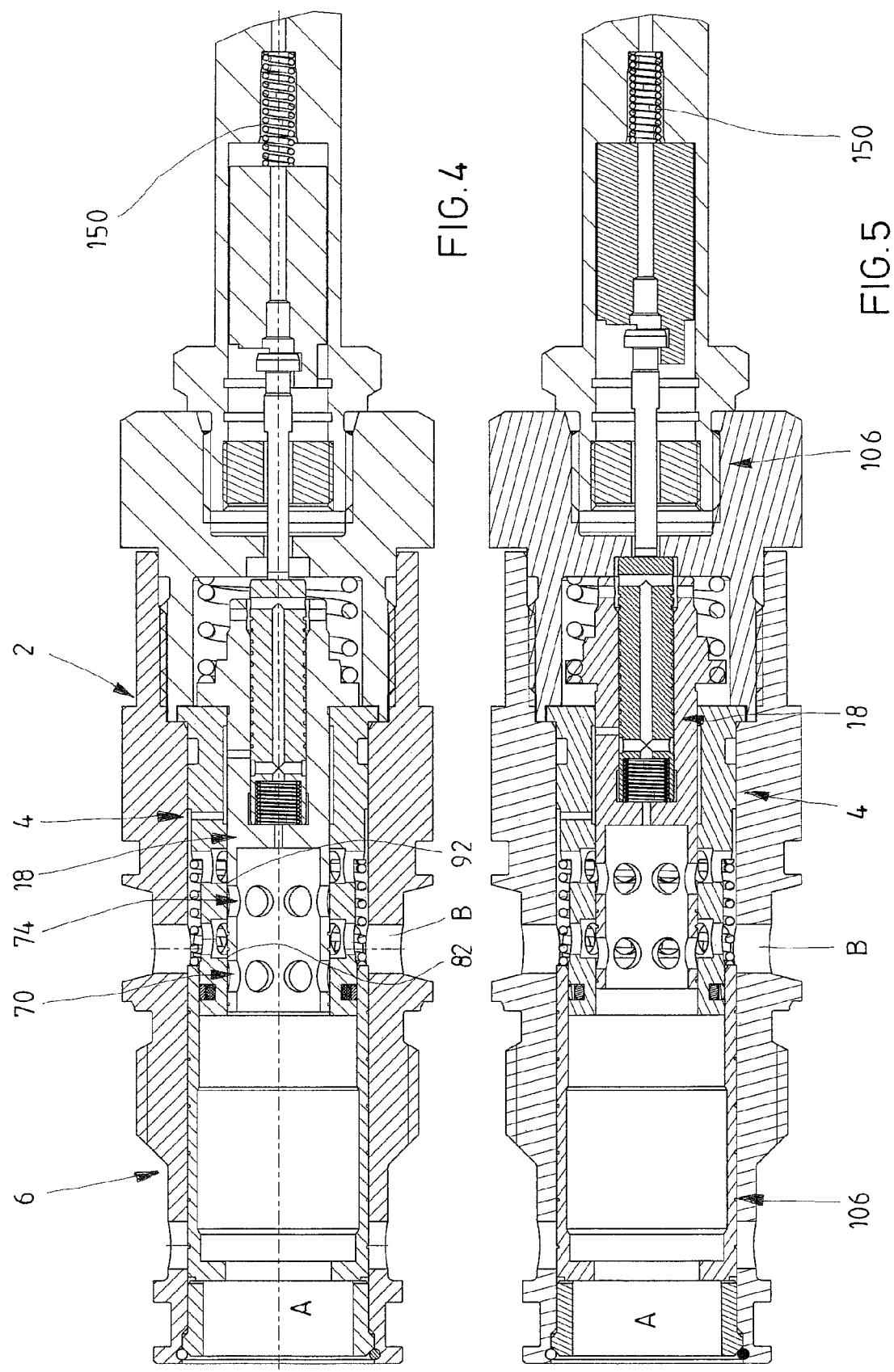
FIG. 4 is a longitudinal section through another exemplary embodiment of a flow control valve.
FIG. 5 shows the flow control valve from FIG. 4 in an open position.

In the embodiment shown in FIG. 4, two parallel control edges 82, 92 are provided, which can, in parallel fashion, open two opening cross sections by means of the two star-shaped arrangements of bores 70 and 74 on the metering orifice slide 18. One difference between the exemplary embodiment shown in FIG. 4 and the exemplary embodiment described above is that in the latter, the opening cross section is opened by sliding the metering orifice slide 18 to the left (in the view shown in FIG. 1), whereas in the exemplary embodiment described below, the metering orifice slide 18 is moved toward the right (kinematic reverse) in order to open the above-mentioned opening cross sections.

Figure 6:
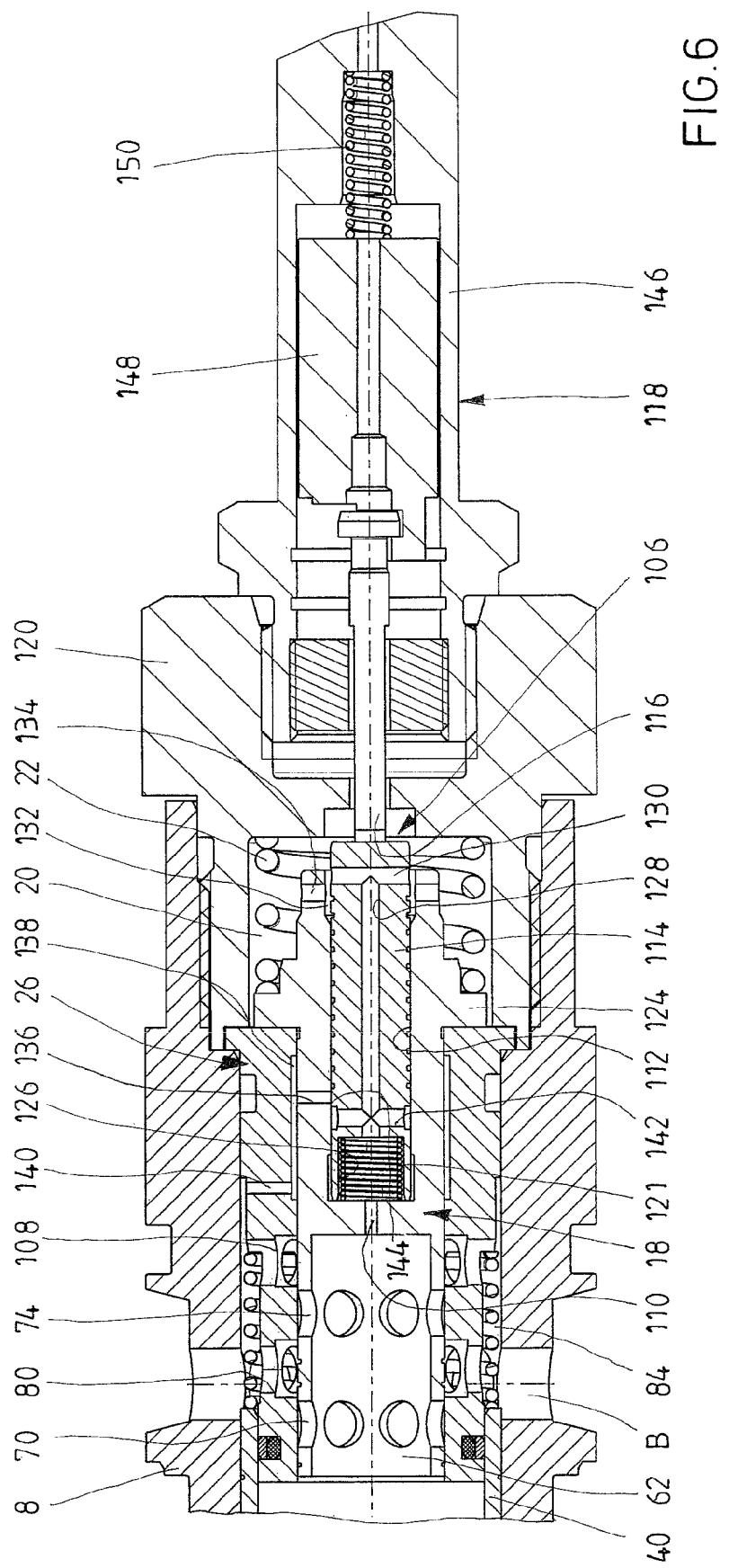
FIG. 6 shows a pilot control, embodied as a sequence control, of the flow control valve from FIG. 4.

Since the basic design of the two flow control valves 2 in FIGS. 1 and 4 is largely identical, corresponding elements are provided with the same reference numerals below for the sake of simplicity. In the depiction shown in FIG. 4, the metering orifice 4 is closed since the two housing control edges 82, 92 of the metering orifice 4 are overlapped by the housing circumference of the metering orifice slide 18. FIG. 5 shows an open position of the metering orifice 4 in which the metering orifice slide 18 is slid to the right by means of the sequence control 106 functioning practically as a pilot control so that the two star-shaped arrangements of bores 70, 74 are partially opened at the two control edges 92, 82 and thus open corresponding opening cross sections to the outlet connection B. The sequence control will now be explained in conjunction with the enlarged depiction in FIG. 6. In FIG. 6, only the right part of the flow control valve 2 from FIG. 4 is shown, with the metering orifice 4 and the sequence control 106. The particular embodiment of the pressure compensator will be discussed later in conjunction with FIG. 7.

In the variant shown in FIGS. 4 through 7, the slide bushing 26 is embodied as slightly shorter than in the exemplary embodiment shown in FIG. 1 and the radially recessed right end section 30 in FIG. 1 is omitted, thus slightly reducing the guide length of the metering orifice slide 18 in the slide bushing 26. As is particularly clear from FIG. 6, the star-shaped arrangements of bores 70, 74 have approximately the same maximum opening cross section—in the exemplary embodiment described above, the opening cross section of the star-shaped arrangement of bores 74 is slightly smaller. In the open position (FIG. 5), the pressure fluid connection is produced from the blind hole bore 62 to the radial outlet connection B via the star-shaped arrangement of radial bores 80 and an additional star-shaped arrangement of radial bores 108 in the slide bushing 26, both of which open into the annular chamber 84 between the radially recessed outer circumference of the slide bushing 26 and the inner circumference wall of a valve bushing 8. This annular chamber 84 is delimited at the left by the rear annular end surface of the pressure compensator spool 40. Additional details regarding the design of the pressure compensator will be explained in conjunction with FIG. 7.

According to FIG. 6, the inner chamber of the metering orifice slide 18 that is referred to as the blind hole bore 62 opens via a throttle bore 110 into a guide bore 112 whose diameter is slightly less than that of the blind hole bore 62. This guide bore 112 has a pilot control spool 114 inserted into it, whose end section on the right in FIG. 6 protrudes out of the right end section of the metering orifice slide 18 and rests against a tappet 116 of a proportional magnet 118. In the exemplary embodiment shown, the pilot control spool 114 is prestressed into this contact position with the tappet 116 by means of a clamping spring 121. In principle, the pilot control spool 114 could also be integrally joined to the tappet 116 or be connected to it in some other way.

The proportional magnet 118 is screwed in a conventional way into a valve bushing 120 that is, in turn, inserted into the cartridge-shaped valve housing 8. This valve bushing 120 delimits the spring chamber 20 for the compression spring 22, which, in the exemplary embodiment shown in FIGS. 4 through 7, prestresses a stop collar 124 of the metering orifice slide 18 against the end surface of the slide bushing 26 on the right side in FIG. 6.

The clamping spring 121 rests against a left annular end surface of the guide bore 112 and is accommodated in a spring chamber 126 of the pilot control spool 114 in order to prestress the latter in the direction of the tappet 116. The spring chamber 126 is connected to the spring chamber 20 via an axial bore 128 and one or more radial bores 130. By contrast with the exemplary embodiment according to FIG. 1, the right end surface of the metering orifice slide 18 protruding into this spring chamber 20 is recessed radially in a stepped fashion; in the region of the mouths of the radial bores 130, the guide bore 112 expands to form an inner circumferential groove 132 that is likewise pressure fluid-connected to the spring chamber 20 via cross bores 134 in the radially recessed end section of the metering orifice slide 18 so that the right end surface of the metering orifice slide 18 is acted on by the pressure in the spring chamber 126, i.e. the pressure downstream of the throttle bore 110.

A comparatively short distance from the spring chamber 126, the casing of the metering orifice slide 18 has a radial conduit 136 passing through it, which is in turn embodied in an annular gap 138 between the outer circumference of the metering orifice slide 18 and the inner circumference wall of the slide bushing 26. This annular gap 138 is pressure fluid-connected via an angular conduit 140 to the above-described annular chamber 84 and therefore also to the radial outlet connection B.

In the neutral position of the pilot control spool 114 shown in FIG. 6, in the region between the right annular end surface of the spring chamber 126 and the radial conduit 136, a radial bore 142 is provided, which opens into an annular groove 144 on the outer circumference of the pilot control spool 114. In the neutral position shown, this annular groove 144 is covered by the inner circumference wall of the guide bore 112. With an axial movement of the pilot control spool 114 toward the right (in the view shown in FIG. 6), the annular groove 144 comes into a position in which it coincides with the radial conduit 136. This opens an outlet throttle cross section leading to the radial conduit 136 so that control fluid can flow out of the inner chamber of the metering orifice slide 18, which is referred to as the "blind hole bore" 62, via the throttle bore 110, the spring chamber 126, the axial bore 128, and the open outlet throttle cross section, through the radial conduit 136, the annular gap 138, and the angular conduit 140 to the working connection B.

The axial movement of the pilot control spool 114 required for this occurs due to the pulling action of the proportional magnet 118 whose armature 148, guided in a pole tube 146 is prestressed in the direction toward the pilot control spool 114 by a regulating spring 150. In the exemplary embodiment shown in FIG. 6, the tappet 116 is suspended in the armature 148 in the usual way. Since the design of such pulling action lifting magnets is known, for a more detailed description regarding the prior art, the reader is referred, for example, to the manual "Der Hydrauliktrainer" [The Hydraulics Trainer], Vols. 1 through 5, published by Vereinigte Fachverlage, Mainz, Germany.

In the neutral position of the flow control valve shown in FIG. 4, the pressure in the inlet connection A acts on the end surface of the metering orifice slide 18 oriented toward the left in FIG. 4. Via the throttle bore 110, the spring chamber 126, the axial bore 128, the radial bore 130, the inner circumferential groove 132, and the cross bore 134, this pressure also acts on the right end surface of the metering orifice slide 18 contained in the spring chamber 20 so that the metering orifice slide 18 is pressure-balanced and is prestressed in the direction of its neutral position by the force of the compression spring 22. The proportional magnet is currentless. The force of the regulating spring 150 presses the armature 148 against the pilot control spool 114 so that the latter is prestressed, counter to the force of the weak clamping spring 121, into its depicted neutral position in which the left annular end surface rests against the adjacent inner end surface of the guide bore 112; the annular groove 144 is overlapped by the inner circumference wall of the guide bore 112 and there is thus no control fluid connection to the radial connection B.

When the proportional magnet 118 is supplied with current, the armature is moved toward the right (in the view according to FIG. 5), counter to the force of the regulating spring 150; the pilot control spool 114 follows this movement due to the force of the clamping spring 121 and is correspondingly moved toward the right. After a certain amount of stroke, the annular groove 144 moves past the overlap and opens an outlet throttle cross section to the radial conduit 136 so that control fluid can flow out of the spring chamber 126 toward the radial working connection B. This relieves the pressure acting on the right end surface of the metering orifice slide 18 in FIG. 6 so that a pressure differential arises, which moves the metering orifice slide 18 toward the right until it assumes a relative position in relation to the pilot control spool 114 in which an equilibrium of forces via the metering orifice slide 18 takes effect. The metering orifice slide 18 thus follows the motion of the pilot control spool 114, whose movement only requires a comparatively small proportional magnet. A sequence control of this kind, particularly in conjunction with the two star-shaped arrangements of bores 70, 74, permits reliable control of the flow forces occurring in the slide 18. This permits an extremely compact design of the flow control valve; under some circumstances, it is possible to eliminate the use of a valve with a larger nominal bore that would be required in the absence of a sequence control of this kind.

Naturally the sequence control explained in conjunction with FIG. 6 can also be used in a valve design according to FIG. 1.

Figure 7:
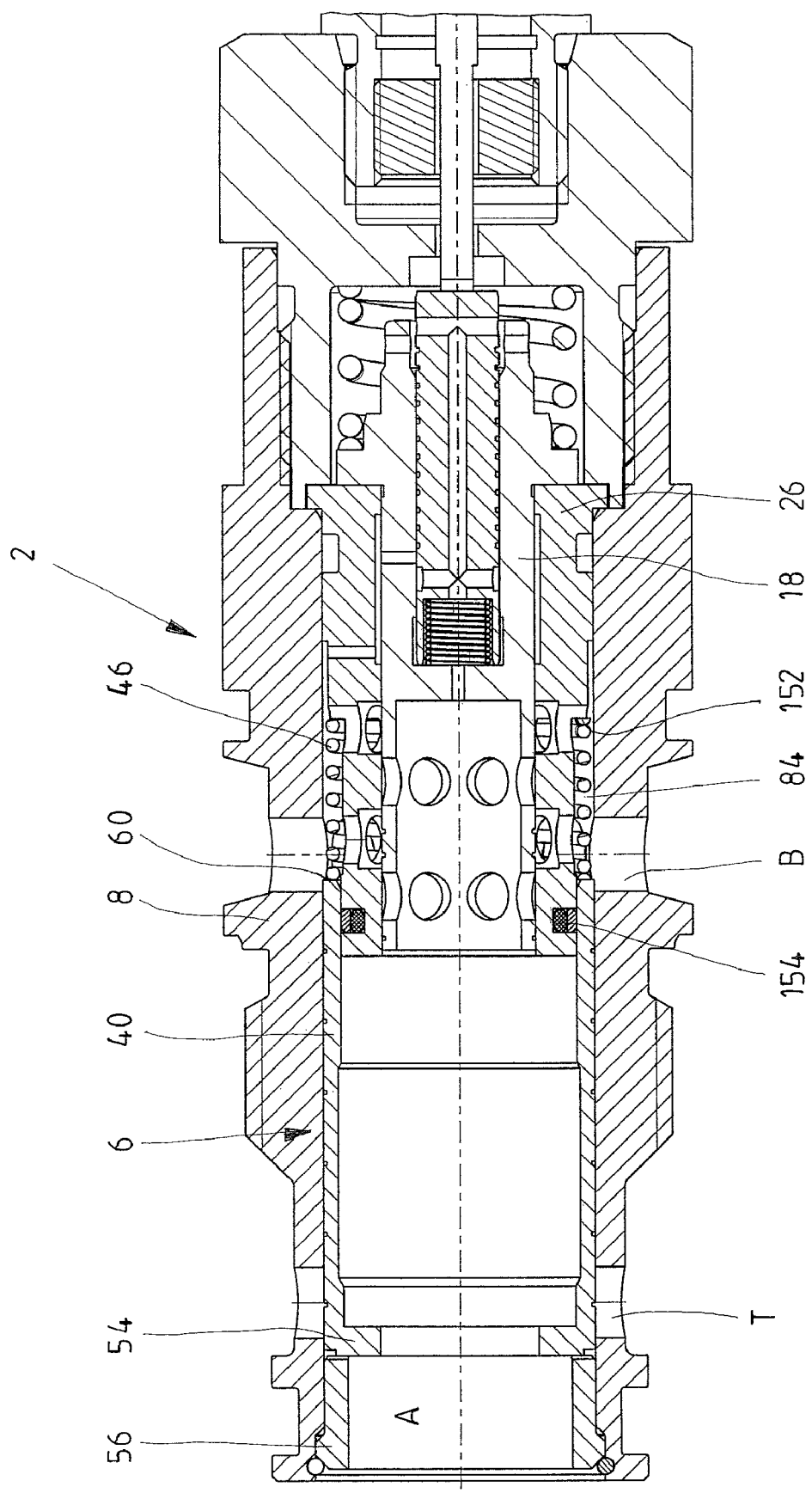
FIG. 7 is an enlarged depiction of the flow control valve from FIG. 4, with a pressure compensator and an adjustable metering orifice.

FIG. 7 shows the pressure compensator part of the flow control valve 2, which is shown in a simplified fashion in comparison to the exemplary embodiment according to FIG. 1. In the embodiment shown in FIG. 7, the pressure compensator bushing 50 (see FIG. 1) for guiding the pressure compensator spool 40 has been omitted; the basic design of the pressure compensator spool 40 essentially corresponds to the one from FIG. 1 so that reference can be made to the explanations made in conjunction therewith. Consequently, in the neutral position of the pressure compensator 6, a collar 54 provided on the left end section of the pressure compensator spool 40 rests against a spacer bushing 56 that is inserted into the cartridge-shaped valve housing 8. The pressure compensator spool 40 is acted on by an inlet pressure oriented toward the inlet connection A. In the exemplary embodiment shown in FIG. 7, the pressure compensator spool 40 is also prestressed into this neutral position by the regulating spring 46, but in contrast to the exemplary embodiment according to FIG. 1, this regulating spring 46 is accommodated not inside the pressure compensator spool, but in the annular chamber 84 and thus rests with its end section on the right (in the view in FIG. 7) against a shoulder 152 of the slide bushing 26 and engages the pressure compensator spool 40 with its other end section.

In a fashion similar to the exemplary embodiment described above, the pressure compensator spool 40 overlaps with the end section of the slide bushing 26 on the left in FIG. 1. In the overlap region, this slide bushing 26 is provided with an annular groove into which a floating ring seal 154 is inserted. On the one hand, this seals the overlap region. But the main advantage is that this floating ring seal 154 subjects the pressure compensator spool 40 to a mechanical friction and therefore damps it so that no undesirable pressure fluctuations are introduced into the system. The design of such floating ring seals is known. In such floating ring seals, usually a ring comprised of a material with good sliding properties such as PTFE, modified with carbon, bronze, or glass fibers, is inserted and pressed against the sliding surface by means of a rubber-elastic ring, for example an O-ring. The intensity of the mechanical friction can be set by the prestressing of the O-ring.

In principle, in simpler applications, a conventional O-ring can be used in lieu of this multipart floating ring seal. Otherwise, the exemplary embodiment shown in FIG. 7 corresponds to a pressure compensator 6 of the previously described exemplary embodiment so that further explanation is unnecessary. Naturally, the damping or the guidance of the pressure compensator spool 40 without a pressure compensator bushing, as demonstrated in conjunction with FIG. 7, can also be used in an exemplary embodiment according to FIG. 1.

FIGS. 1 through 7 depict flow control valves equipped with a pressure compensator and an adjustable metering orifice. However, the present invention is in no way limited to such 2-way or 3-way flow control valves and can instead be used in any form of switchable or continuously adjustable directional or flow control valves.

Figure 8:
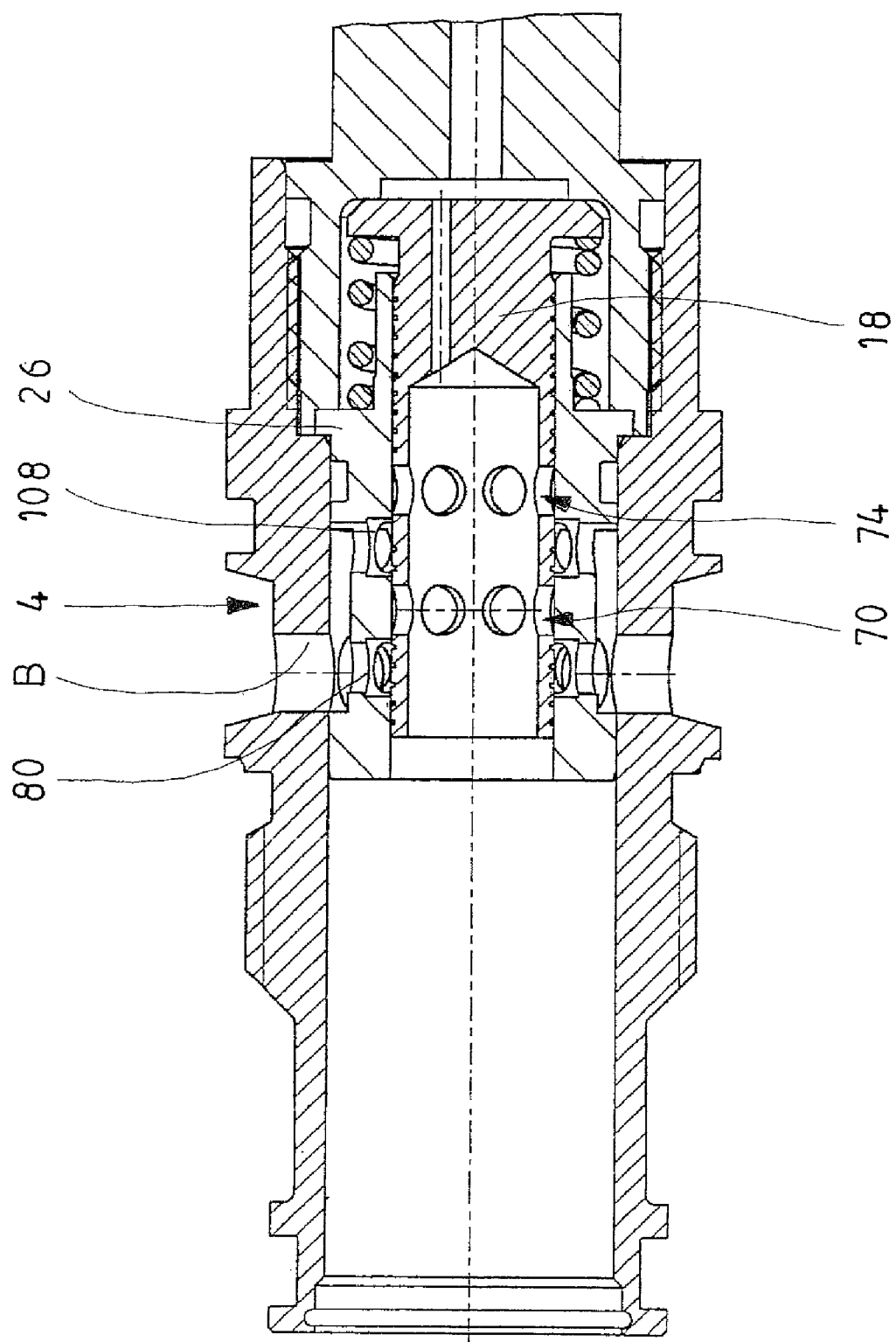
FIG. 8 is a 2-way orifice embodied in accordance with the concept of the present invention.

FIG. 8 shows an exemplary embodiment of a 2-way orifice whose basic design corresponds in principle to the design of the adjustable metering orifice 4 from FIG. 1. The only difference from the exemplary embodiment according to FIG. 1 is that the metering orifice 4 is not associated with a pressure compensator 6. In addition—as in the exemplary embodiments according to FIGS. 4 through 7—the two star-shaped arrangements of bores 70, 74 are embodied with the same maximum opening cross section and the pressure fluid connection to the radial outlet connection B is produced—as in the exemplary embodiment according to FIG. 4—via two star-shaped arrangements of radial bores 80, 108 in the slide bushing 26 in which the metering orifice slide 18 is guided. Otherwise, this exemplary embodiment corresponds to the one from FIG. 1, rendering further explanations unnecessary. The movement of the metering orifice slide 18 can occur directly by means of an actuator, for example a proportional magnet, or by means of a pilot control, for example by means of a sequence control according to FIG. 6.

According to the invention, the directional or flow control valve has an inlet connection and an outlet connection and has a slide that can control a fluid connection between the inlet connection and the outlet connection. The slide controls the fluid connection in at least two adjustable opening cross sections that are spaced axially apart from each other and allow a parallel flow to pass through.

It will be understood that each of the elements described above, or two or more together, may also find a useful application in other types of constructions differing from the type described above.

While the invention has been illustrated and described as embodied in a directional or flow control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A valve formed as a flow control valve, comprising an inlet connection; an outlet connection; a slide that controls a fluid connection between said inlet connection and said outlet connection, said slide being configured so that it controls the fluid connection in at least two adjustable opening cross-sections that are spaced axially apart from each other and allow a partial flow to pass through, wherein a first of the adjustable opening cross sections is determined by a first control edge on bushing and a circumference bore of the slide and a second of the adjustable opening cross sections is determined by a second control edge on the bushing and a second circumference bore of the slide, wherein a spring chamber is delimited by said slide, wherein a hydraulic sequence control is provided for moving said slide and includes a pilot control spool guided in a blind hole bore of said slide and adjustable by an actuator, wherein a throttle bore is located in said slide and an axial bore is located in said pilot control spool for providing control fluid to said spring chamber, and wherein said pilot control spool controls an outlet cross section at a conduit in said slide that allows outflow of the control fluid from said spring chamber.

2. A valve as defined in claim 1, wherein said slide is configured as a hollow slide through which a pressure fluid is flowable.

3. A valve as defined in claim 1, wherein a pressure upstream of an outlet throttle cross-section acts on said slide in a direction toward a reduction in the opening cross-section and a pressure in said inlet connection acts on said slide in a direction toward an increase in the opening cross-section.

4. A valve as defined in claim 3, wherein said actuator is configured as a proportional magnet.

5. A valve as defined in claim 4; and further comprising a clamping spring which prestresses said pilot control spool against a tappet of said proportional magnet.

6. A valve as defined in claim 1, wherein the valve is configured as a valve selected from the group consisting of a switchable valve and a continuously adjustable valve, and also selected from the group consisting of 2/2-way valve and 2/2-way orifice.

* * * * *